United States Patent
Vijay et al.

(10) Patent No.: US 11,078,937 B2
(45) Date of Patent: Aug. 3, 2021

(54) PERFORMANCE ENHANCEMENT OF CONTROLLERS FOR VARYING TEMPERATURE CONDITIONS IN HYDRAULIC ACTUATORS

(71) Applicant: Hamilton Sundstrand Corporation, Charlotte, NC (US)

(72) Inventors: Ashish Vijay, Rajasthan (IN); Harish Venkatesha, Karnataka (IN); Anil Prasad Josyula, Andra Pradesh (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/716,590

(22) Filed: Dec. 17, 2019

(65) Prior Publication Data

US 2021/0115951 A1  Apr. 22, 2021

(30) Foreign Application Priority Data

Oct. 17, 2019 (IN) .............................. 201911042162

(51) Int. Cl.
 *F15B 21/08* (2006.01)
(52) U.S. Cl.
 CPC ........ *F15B 21/087* (2013.01); *F15B 2215/00* (2013.01)
(58) Field of Classification Search
 CPC .............................. F15B 21/087; F15B 15/18
 See application file for complete search history.

(56) References Cited

U.S. PATENT DOCUMENTS

| | | | |
|---|---|---|---|
| 4,542,652 A | 9/1985 | Reuter et al. | |
| 4,543,649 A * | 9/1985 | Head | B60G 17/01933 367/96 |
| 4,995,635 A | 2/1991 | Guy | |
| 6,119,579 A * | 9/2000 | Pawelski | B60G 17/01933 92/5 R |
| 6,267,042 B1 | 7/2001 | Nagai | |

(Continued)

FOREIGN PATENT DOCUMENTS

| DE | 3031980 A1 | 4/1982 |
|---|---|---|
| EP | 3744987 A1 | 12/2020 |

(Continued)

OTHER PUBLICATIONS

Extended European Search Report dated Mar. 17, 2021 for European Patent Application No. 20202506.0, 12 pages.

*Primary Examiner* — Ronald D Hartman, Jr.
(74) *Attorney, Agent, or Firm* — Cantor Colburn LLP

(57) ABSTRACT

Provided are embodiments for a system including an adaptive controller, wherein the system includes a hydraulic actuator including a fluid medium, and a sensor that is disposed on the hydraulic actuator, wherein the sensor is configured to obtain sensor data of the actuator. The system also includes a processor configured to calculate an ultrasonic velocity in the fluid medium using the sensor data, wherein the processor is further configured to determine a temperature of the fluid medium based at least in part on the calculated velocity, and a controller coupled to the actuator, wherein the controller is configured to control the actuator based at least in part on the calculated velocity and determined temperature. Also provided are embodiments for a method for operating the adaptive controller.

14 Claims, 4 Drawing Sheets

(56) References Cited

U.S. PATENT DOCUMENTS

| | | | |
|---|---|---|---|
| 6,549,873 B1* | 4/2003 | Nagai | F15B 21/045 |
| | | | 367/97 |
| 7,377,169 B2* | 5/2008 | Myers | G01N 29/024 |
| | | | 73/587 |
| 9,187,974 B2* | 11/2015 | Coonrod | G01S 15/87 |
| 9,804,039 B2 | 10/2017 | Reyes, III et al. | |
| 10,288,091 B2 | 5/2019 | Jirgal et al. | |
| 2017/0114807 A1* | 4/2017 | Afshari | F15B 11/003 |
| 2017/0362929 A1* | 12/2017 | Leach | E21B 33/06 |
| 2018/0066493 A1* | 3/2018 | Leach | E21B 34/16 |

FOREIGN PATENT DOCUMENTS

| | | |
|---|---|---|
| JP | 5962705 A | 4/1984 |
| JP | 9292270 A | 11/1997 |
| WO | 2005003571 A1 | 1/2005 |

\* cited by examiner

PERFORMANCE ENHANCEMENT OF CONTROLLERS FOR VARYING TEMPERATURE CONDITIONS IN HYDRAULIC ACTUATORS

CROSS-REFERENCE TO RELATED APPLICATIONS

This application claims the benefit of Indian Application No. 201911042162 filed Oct. 17, 2019, which is incorporated herein by reference in its entirety.

BACKGROUND

The present disclosure relates generally to actuators or more specifically to enhancing the performance of the controllers for varying temperature conditions in hydraulic actuators without the use of temperatures sensors.

Hydraulic actuators typically consist of a cylinder with hydraulic fluid that is enclosed within. The fluid is used to move a piston that is within the cylinder to drive an attached load. In operation, the position of the piston is controlled by manipulating the flow of hydraulic fluid in the cylinder using a bidirectional servo valve. With variations in environmental factors like temperature, the mechanical properties of the actuator, particularly the hydraulic fluid, vary which can hinder the performance of controllers. Current controllers may therefore not be able to achieve the optimal performance metrics for all operating temperatures of the hydraulic actuator system.

BRIEF DESCRIPTION

Disclosed is an embodiment of a system including an adaptive controller. The system includes a hydraulic actuator having a fluid medium; a sensor that is disposed on the hydraulic actuator, wherein the sensor is configured to obtain sensor data of the actuator; and a processor configured to calculate an ultrasonic velocity in the fluid medium using the sensor data. The processor is further configured to determine a temperature of the fluid medium based at least in part on the calculated velocity. The system also includes a controller coupled to the actuator, wherein the controller is configured to control the actuator based at least in part on the calculated velocity and determined temperature.

In addition to one or more of the features described herein, or as an alternative, further embodiments include an ultrasonic position sensor.

In addition to one or more of the features described herein, or as an alternative, further embodiments include using an actuator having a stepped target which is used to measure a duration of a pulse to traverse the fluid medium to and from the target.

In addition to one or more of the features described herein, or as an alternative, further embodiments include obtaining sensor data including a first duration for a first pulse to traverse the fluid medium to the stepped target and a second duration for a second pulse to traverse the fluid medium to the stepped target.

In addition to one or more of the features described herein, or as an alternative, further embodiments include measuring a first duration from a first location of the stepped target and a second duration from a second location of the stepped target, wherein the first location is at a different distance from the sensor as the second location.

In addition to one or more of the features described herein, or as an alternative, further embodiments include calculating the ultrasonic velocity according to the following equation:

$$\text{Speed }(@k) = \frac{T2(@k) - T1(@k)}{h}$$

wherein T1 is a first duration for a pulse signal to traverse the fluid medium; T2 is a second duration for a pulse signal to traverse the fluid medium, k is the current temperature of the fluid medium; and h is a height of the stepped target of the actuator.

In addition to one or more of the features described herein, or as an alternative, further embodiments include a controller including a speed-temperature lookup table (LUT) and a temperature-PI controller LUT to determine the command signal.

In addition to one or more of the features described herein, or as an alternative, further embodiments include using a dual-sensor arrangement configured to obtain first sensor data and second sensor data.

Also disclosed is a method for controlling a hydraulic actuator. The method includes obtaining sensor data of an actuator; calculating an ultrasonic velocity in a fluid medium of the actuator based at least in part on the sensor data; determining a temperature of the fluid medium based at least in part on the calculated velocity; and controlling the actuator based at least in part on the calculated velocity and determined temperature.

In addition to one or more of the features described herein, or as an alternative, further embodiments include obtaining sensor data using an ultrasonic position sensor.

In addition to one or more of the features described herein, or as an alternative, further embodiments include an actuator having a stepped target which is used to measure a duration of a pulse to traverse the fluid medium to and from the target.

In addition to one or more of the features described herein, or as an alternative, further embodiments include obtaining sensor data by sending a first pulse across the fluid medium to the stepped target to determine a first duration and sending a second pulse across the fluid medium to the stepped target to determine a second pulse.

In addition to one or more of the features described herein, or as an alternative, further embodiments include measuring a first duration from a first location of the stepped target and a second duration from a second location of the stepped target, wherein the first location is at a different distance from the sensor as the second location.

In addition to one or more of the features described herein, or as an alternative, further embodiments include calculating the ultrasonic velocity according to the following equation:

$$\text{Speed }(@k) = \frac{T2(@k) - T1(@k)}{h}$$

wherein T1 is a first duration for a pulse signal to traverse the fluid medium; T2 is a second duration for a pulse signal to traverse the fluid medium, k is the current temperature of the fluid medium; and h is a height of the stepped target of the actuator.

In addition to one or more of the features described herein, or as an alternative, further embodiments include referencing a speed-temperature lookup table (LUT) and a temperature-PI controller LUT to determine a command signal to control the actuator.

In addition to one or more of the features described herein, or as an alternative, further embodiments include using a first sensor and a second sensor in a dual-sensor arrangement to obtain first sensor data and second sensor data.

BRIEF DESCRIPTION OF THE DRAWINGS

The following descriptions should not be considered limiting in any way. With reference to the accompanying drawings, like elements are numbered alike.

DETAILED DESCRIPTION

As discussed generally above, the mechanical properties of the hydraulic actuator, especially that of the hydraulic fluid medium inside the cylinder, vary considerably with respect to changes in temperature. Thus the dynamic response of the system will vary, although the steady-state response may remain the same. Thus, the system can become sluggish at low temperatures and highly responsive at high temperatures. This change in system dynamics with respect to temperature hinders the controller from achieving optimal dynamic performance for the full temperature range.

Due to variation in responsiveness of the system with respect to temperature, the same current command may result in different flow rates of the medium for different temperatures. Since the mechanical sizing of the actuator valve is designed to meet the minimum performance for all temperature ranges, a fixed controller may result in higher overshoots at higher temperatures.

Applications in the aerospace industry have very stringent accuracy and performance requirements. Hence, an adaptive controller is necessary where the system parameters vary significantly with temperature. Existing techniques use temperature sensors and update the controller gains and saturation values based on an understanding of the system behavior at different temperatures. However, this kind of architecture has limitations in terms of cost, weight, space occupied, etc. as there are additional sensors and associated circuitry involved. The typical sensors often used in aerospace applications for hydraulic actuator position sensing include but are not limited to the following: voltage difference transformer (LVDT, RVDT), resolvers, encoders, Hall effects sensors, etc.

Such sensors are usually of relatively high cost, weight and size. Also, in order to accommodate those sensors for previously designed actuators, modifications need to be carried out in the actuator or valve design.

The techniques provided herein replace these sensors with ultrasonic technology. Such technology allows for a non-invasive sensing approach can be easily integrated with existing actuator or valve designs. Ultrasonic position sensing works on the principle of sound reflection. However, as the temperature changes, properties of the hydraulic fluid medium also changes, which affect the speed of ultrasound in the medium. This can be used to obtain temperature without the use of any additional sensor. Embodiments disclose herein may achieve improved or optimal performance at all operating temperature through an adaptive control algorithm without the use of any temperature sensors.

Figure 1:
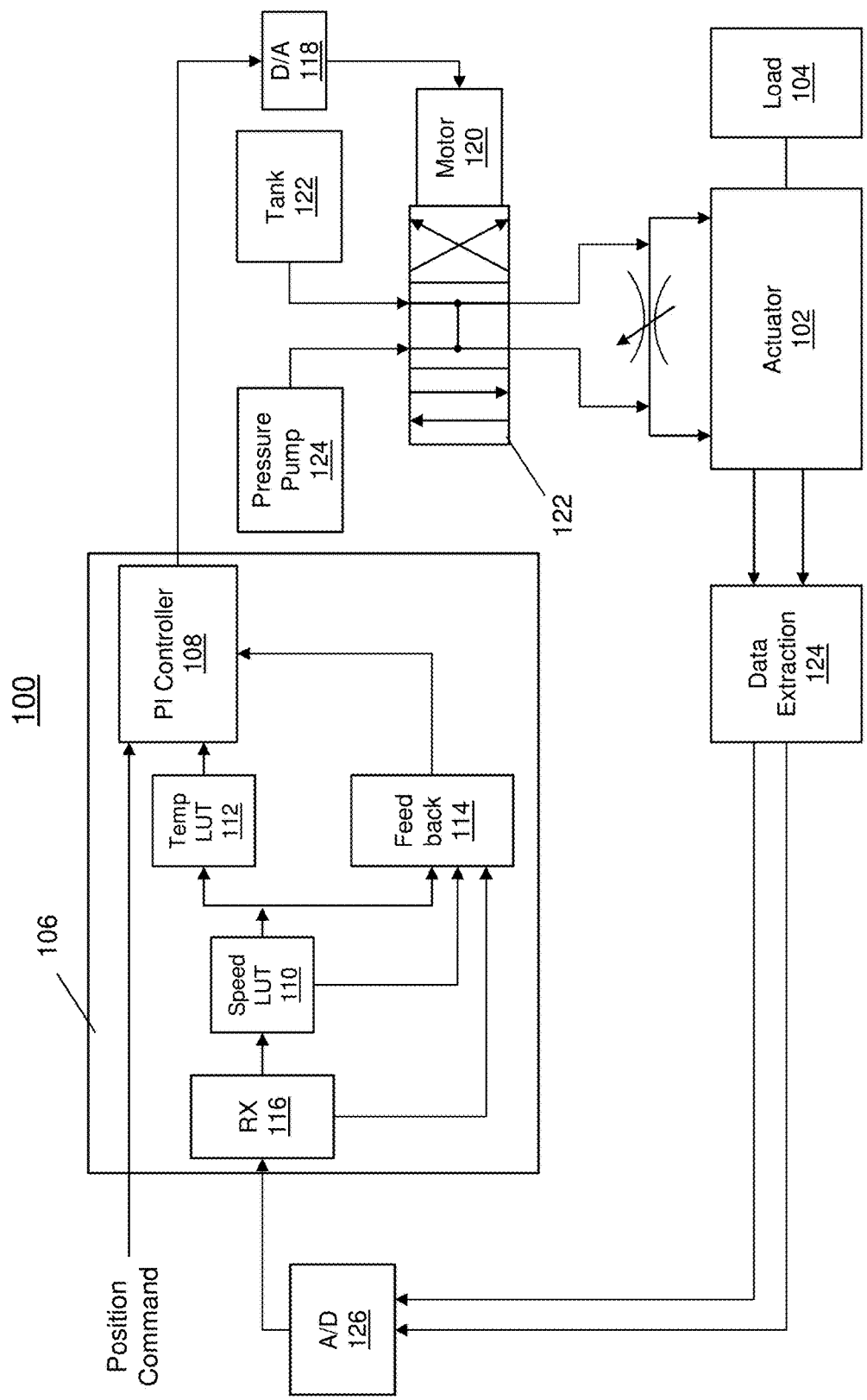
FIG. 1 depicts a system including a hydraulic actuator for practicing the techniques described herein.

Now referring to FIG. 1, a system 100 in accordance with one or more embodiments is shown. The system 100 includes an actuator 102 that is mechanically coupled to a load 104. Example loads include production machinery, automation equipment, valves, etc. The actuator 102 is under control of the control device 106 which includes a plurality of components. As illustrated, the control device 106 includes a PI controller 108, a speed LUT 110, a temperature LUT 112, a feedback module 114, and a receiver 116. It should be understood that the relationship between the speed of ultrasound and the temperature of hydraulic fluid provided in the form of the speed LUT 110 is only a single way of expressing the relationship. The same relationship can be established in any other form and can be used within the scope of the aspects of the disclosure. Similarly the relationship between the temperature of ultrasound and the controller parameters, which include but are not limited to controller gains, saturation values, etc. can be of any form other than temperature LUT 112 and are within the scope of the aspects of the disclosure.

The output of the control device 106 is provided to a D/A converter 118 to provide a current command to a motor 120. The motor 120 is coupled to the servo valve 122, where the servo valve 122 is coupled to a tank 122 and a pump 124 which provides the fluid to the actuator 102. In one or more embodiments of the disclosure the fluid is coupled to a servo valve 122. The actuator 102 includes one or more sensors such as ultrasonic position sensors. Further detail for the actuator 102 is discussed below with reference to FIG. 2. The output for the sensors is provided to a data extraction module 124 which further provides the data to the device 106 through the A/D convertor 126. It should be understood FIG. 1 is not intended to be limiting and additional components can be incorporated into the system 100.

Figure 2:
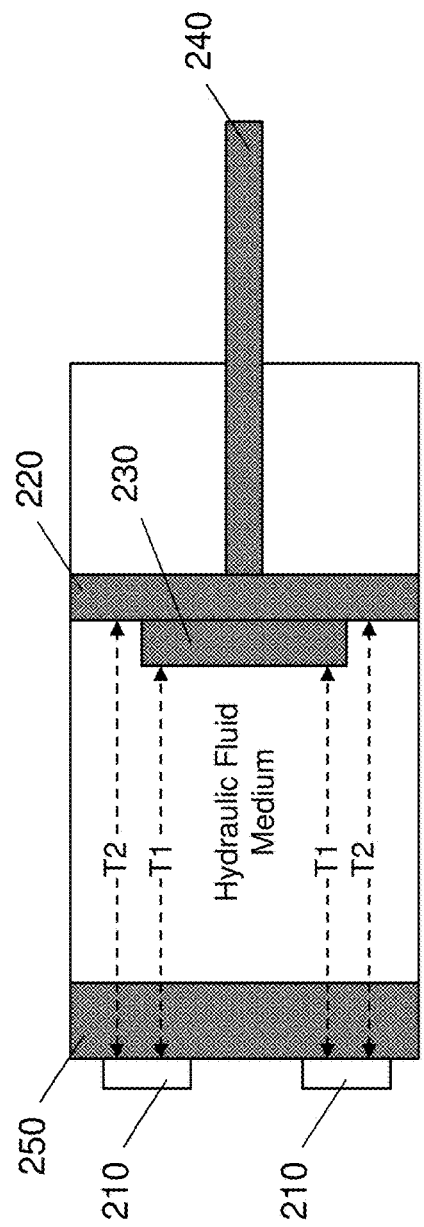
FIG. 2 depicts the hydraulic actuator in accordance with one or more embodiments of the disclosure.

Now referring to FIG. 2 an actuator 200 in accordance with one or more embodiments of the disclosure is shown. The actuator 200 includes a position/displacement sensing setup as described below. This setup includes an ultrasonic position sensor 210 (trans-receiver), an aluminum plate 250, a hydraulic fluid medium and a stepped steel target 220, 230 connected rigidly to the actuator piston 240. The ultrasonic signal traverses through the aluminum plate 250, hydraulic fluid medium and gets reflected on encountering the moving stepped steel target 220, 230. Here T1 is the time taken for the pulse to travel to and from the first plane of the target (step) 230 and T2 is the time taken for the pulse to travel to and fro from second plane (base) 220 of the target.

In one or more embodiments of the disclosure, a dual-sensor arrangement is used and provides a redundant architecture to meet the safety requirements. It should be understood that a single sensor can be used to perform the techniques described herein.

Based on the time taken for the ultrasonic signal to return to the sensor 210 and the knowledge its speed in the medium, the distance of the target can be determined. However, the properties of fluid changes with environmental conditions, which affect the speed of ultrasonic signal in these mediums. It has been observed that the variation of the speed of the ultrasonic signal in these mediums is substantially influenced by the temperature. The ultrasonic speed is a function of the temperature for hydraulic fluid.

By using the position sensing configuration of the actuator shown in FIGS. 1 and 2, since the step height of the stepped target is fixed, the time difference T2 and T1 can be used to calculate the speed of ultrasonic signal in the fluid medium for any temperature. In one or more embodiments of the disclosure, the calculation for the ultrasonic velocity is performed by the following equation (Eq. 1):

$$\text{Speed }(@k) = \frac{T2(@k) - T1(@k)}{h}$$

wherein T1 is a first duration for a pulse signal to traverse the fluid medium; T2 is a second duration for a pulse signal to traverse the fluid medium, k is the current temperature of the fluid medium; and h is the height of the step of the target.

It should be understood that the relationship can be any form such a linear, polynomial, piecewise linear or LUT, etc. In one or more embodiments of the disclosure the The relationship between the temperature of the fluid medium and the speed of the ultrasound in the fluid medium can be established offline in a lab environment. This relationship can be in any form such as a linear, polynomial, piecewise linear, LUT, etc. In an example, during flight the speed of the ultrasound can be calculated using Eq. 1. The calculated speed can be input into the defined relationship mapping the speed of the ultrasound to the temperature of the fluid medium. From the defined relationship, the current temperature of the fluid medium can be obtained during run time.

With temperature, the system dynamics change due to variation in parameters like fluid density, kinematic viscosity, etc. This can also be analyzed offline in a lab environment and gains for PI controller to control the plant can be tuned separately for optimal performance at different temperatures. Thus a relation between the temperature of the fluid and the PI controller gains can be established in the form of an equation or lookup table. Further, "flow rate v/s input current command" can be modeled for the system at different temperatures, and a similar relation can be established between temperature and saturation values for PI controller such that the input current command at any temperature would never cause the flow rate to go beyond a limiting value.

Thus, once the temperature of the fluid medium is determined from the relationship between the speed of ultrasound in fluid and fluid temperature, we can now input this temperature into the temperature-PI relation and determine the appropriate PI gains and saturation values to be used in the control algorithm for different temperatures. Thus, this type of controller performs adaptive gain scheduling and saturation to overcome the issues faced in conventional control architectures.

In other words, the performance of the hydraulic actuator controllers is enhanced by controlling the actuator under varying temperature conditions without the use of any additional sensors.

Figure 3:
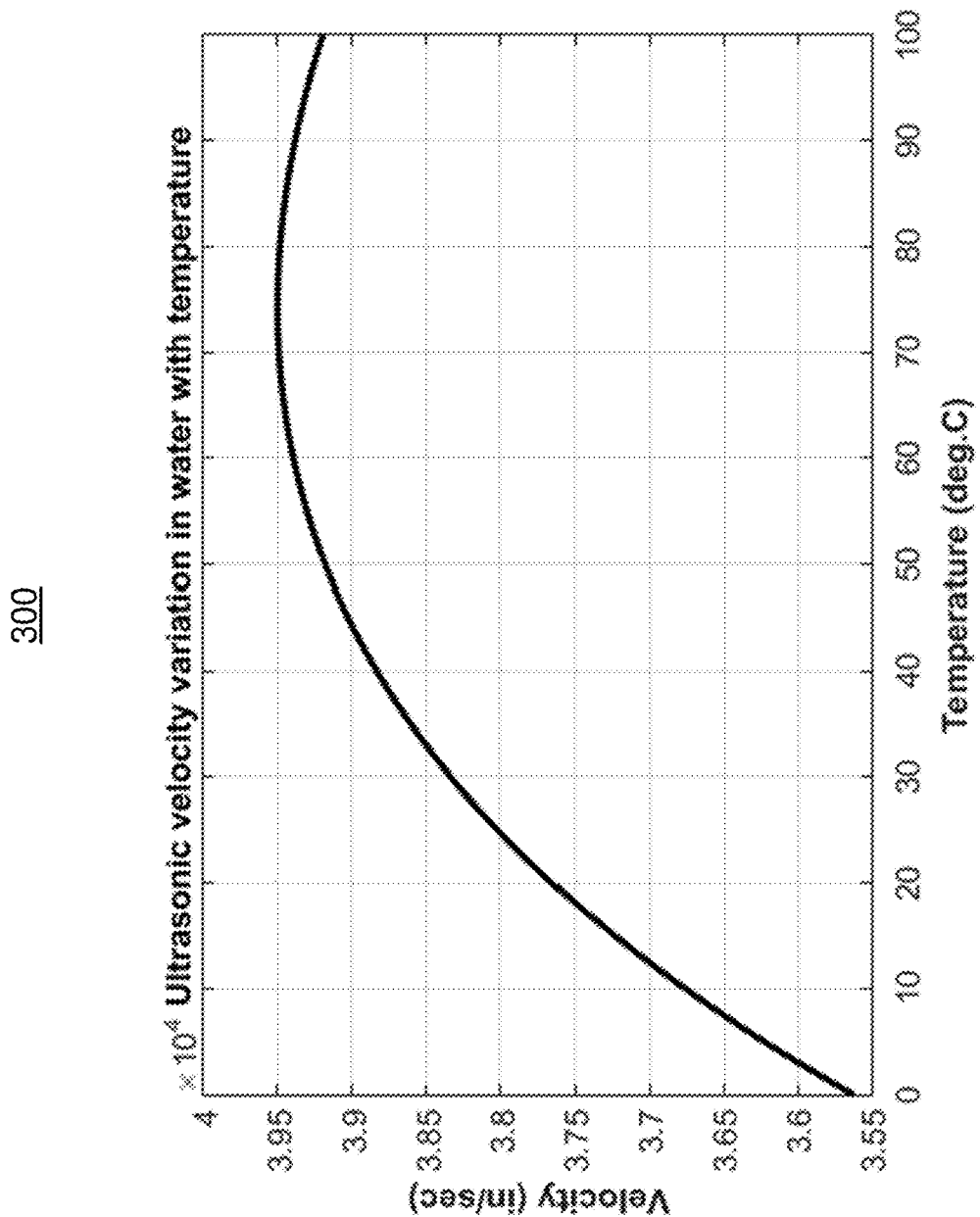
FIG. 3 depicts an example graph illustrating the ultrasonic velocity variation in water with temperature.

Now FIG. 3 illustrates a graph 300 the ultrasonic velocity variation in water over a range of temperatures. The x-axis represents the temperature (deg.C) and the y-axis represents the velocity (in/sec). The graph 300 illustrates as the temperature increases the velocity of the fluid increases to approximately 70 deg.C and begins to taper off. This can be correlated to the performance of the actuator system such as the system 100 shown in FIG. 1. At low temperatures due to the lower temperatures, the actuator may be less responsive when compared to higher temperatures.

Figure 4:
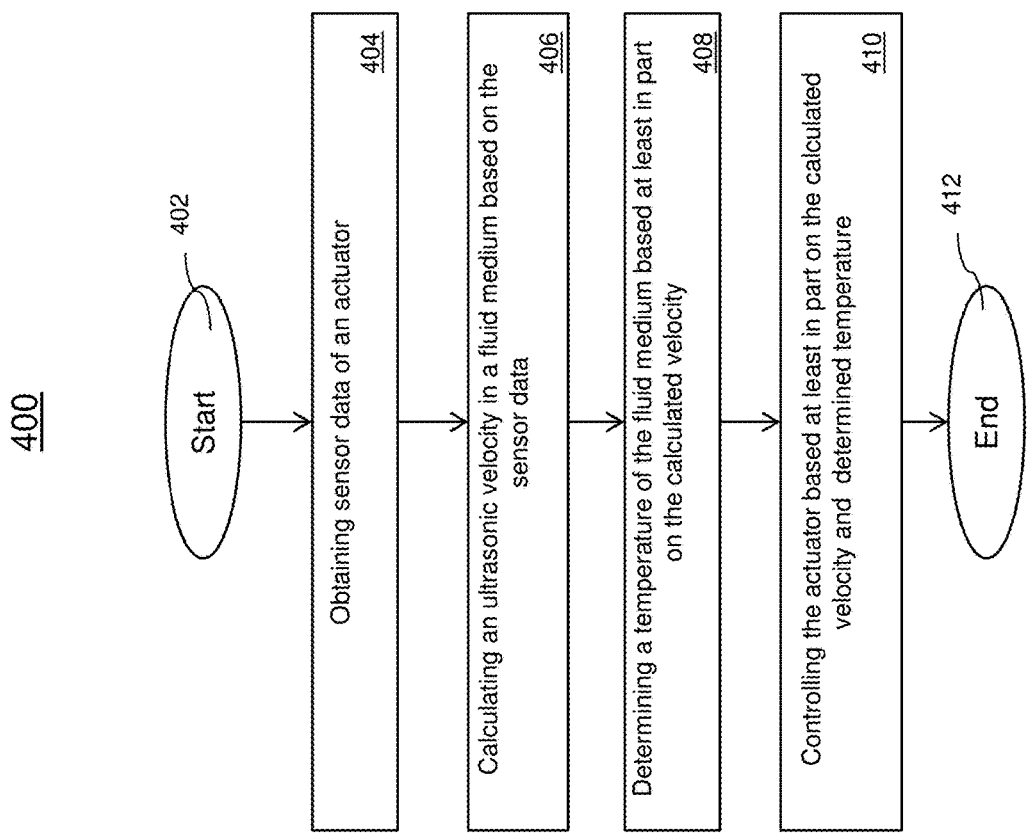
FIG. 4 depicts an example flowchart for performing the method described herein.

Now referring to FIG. 4, a flowchart of a method 400 for operating an adaptive actuator controller in accordance with one or more embodiments is shown. The method 400 begins at block 402 and proceeds to block 404 which provides for obtaining sensor data of an actuator. The sensor data includes the first duration (T1) and the second duration (T2) that are obtained using the ultrasonic position sensors. Block 406 calculates an ultrasonic velocity in a fluid medium based on the sensor data. The method 400 proceeds to block 408 and provides for determining a temperature of the fluid medium based at least in part on the calculated velocity. In some embodiments, the ultrasonic speed and fluid relationship is obtained from a speed-temp LUT. Block 410 controls the actuator based at least in part on the calculated velocity and the determined temperature. The control includes determining the PI controller gain and saturation values for controlling the actuator and is obtained from a fluid temperature-PI LUT. The LUT is not intended to be a limiting implementation of the aspects of the disclosure and it should be understood that any form of relationship can be used within the scope of one or more aspects of the disclosure such as a linear, polynomial, piecewise linear relationships, etc. The actuator is controlled according to the values. The method 400 ends at block 412. The steps provided in FIG. 4 are not intended to be limiting and it should be understood that other steps or a different sequence of steps are within the scope of the disclosure.

The technical effects and benefits include providing an adaptive controller that operates consistently across a wide range of temperatures. In addition, the adaptive controller can be implemented without increasing cost and the weight of the system because additional sensors are not required. The technical effects and benefits include providing real-time position control of the actuator.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system including an adaptive controller, the system comprising:
   a hydraulic actuator comprising a fluid medium;
   a sensor that is disposed on the hydraulic actuator, wherein the sensor is configured to obtain sensor data of the actuator; and
   a processor configured to calculate an ultrasonic velocity in the fluid medium using the sensor data, wherein the processor is further configured to determine a temperature of the fluid medium based at least in part on the calculated velocity; and
   a controller coupled to the actuator, wherein the controller is configured to control the actuator based at least in part on the calculated velocity and determined temperature, wherein the controller further comprises a speed-temperature lookup table (LUT) and a temperature-PI controller LUT to determine the command signal.

2. The system of claim 1, wherein the sensor is an ultrasonic position sensor.

3. The system of claim 1, wherein the actuator comprises a stepped target which is used to measure a duration of a pulse to traverse the fluid medium to and from the target.

4. The system of claim 3, wherein the sensor data comprises a first duration for a first pulse to traverse the fluid medium to the stepped target and a second duration for a second pulse to traverse the fluid medium to the stepped target.

5. The system of claim 4, wherein the first duration is measured from a first location of the stepped target and the second duration is measured from a second location of the stepped target, wherein the first location is at a different distance from the sensor as the second location.

6. The system of claim 1, wherein the calculation for the ultrasonic velocity is calculated according to the following equation:

$$\text{Speed}(@k) = \frac{T2(@k) - T1(@k)}{h}$$

wherein T1 is a first duration for a pulse signal to traverse the fluid medium; T2 is a second duration for a pulse signal to traverse the fluid medium, k is the current temperature of the fluid medium; and h is a height of the stepped target of the actuator.

7. The system of claim 1, further comprising a dual-sensor arrangement configured to obtain first sensor data and second sensor data.

8. A method for controlling a hydraulic actuator, the method comprising:
   obtaining sensor data of an actuator;
   calculating an ultrasonic velocity in a fluid medium of the actuator based at least in part on the sensor data;
   determining a temperature of the fluid medium based at least in part on the calculated velocity;
   referencing a speed-temperature lookup table (LUT) and a temperature-PI controller LUT to determine a command signal to control the actuator; and
   controlling the actuator based at least in part on the calculated velocity and determined temperature.

9. The method of claim 8, wherein the sensor data is obtained using an ultrasonic position sensor.

10. The method of claim 8, wherein the actuator comprises a stepped target which is used to measure a duration of a pulse to traverse the fluid medium to and from the target.

11. The method of claim 10, wherein the sensor data is obtained by sending a first pulse across the fluid medium to the stepped target to determine a first duration and sending a second pulse across the fluid medium to the stepped target to determine a second pulse.

12. The method of claim 11, wherein the first duration is measured from a first location of the stepped target and the second duration is measured from a second location of the stepped target, wherein the first location is at a different distance from the sensor as the second location.

13. The method of claim 8, wherein the calculation for the ultrasonic velocity is calculated according to the following equation:

$$\text{Speed}(@k) = \frac{T2(@k) - T1(@k)}{h}$$

wherein T1 is a first duration for a pulse signal to traverse the fluid medium; T2 is a second duration for a pulse signal to traverse the fluid medium, k is the current temperature of the fluid medium; and h is a height of the stepped target of the actuator.

14. The method of claim 8, further comprising using a first sensor and a second sensor in a dual-sensor arrangement to obtain first sensor data and second sensor data.

* * * * *